3,040,001
DRY BRIGHT WAXY RESIN

Ronald L. Broadhead, Park Forest, Ill., assignor to Standard Oil Company, Chicago, Ill., a corporation of Indiana
No Drawing. Filed Sept. 24, 1959, Ser. No. 841,954
11 Claims. (Cl. 260—77)

This invention relates to resins possessing waxy properties and particularly waxy resins having dry-bright and smear resistance when applied to a surface.

An object of the invention is a resinous solid having waxy characteristics. Another object is a resinous solid capable of forming a wear resistant surface coating. Yet another object is a resinous solid capable of forming from solution a dry-bright surface coating. Still another object is a resinous solid capable of forming from solution a dry-bright surface coating which coating is smear-resistant. A further object is a resinous solid capable of forming from solution a dry-bright surface coating which has a high degree of water repellency. A still further object is a resinous solid capable of forming from solution a dry-bright surface coating which has no substantial tendency for dust-pickup. A desired object is a resinous solid capable of forming from solution a surface coating on a wooden object, which object can be varnished without first removing said coating. Other objects will become apparent in the course of the detailed description of the invention.

One or more or all of the above objects is obtained in the resin polyesterification-condensation reaction product of a monoester of a benzene tricarboxylic acid or anhydride and an alkanol containing from at least 18 to about 30 carbon atoms with a $C_2$–$C_6$ alkanediol to get a resin having an acid number (mg. KOH per g. of resin) of not more than about 30.

Instead of using an already existing monoester, a monoester may be made as a first step in the preparation of the resin by the ester reaction of the hereinafter defined benzene tricarboxylic acid or anhydride with an alkanol—or mixture thereof—containing from at least 18 to about 30 carbon atoms. Illustrative alkanols are stearyl, $C_{18}$; docosanol, $C_{22}$; ceryl, $C_{26}$ and myricyl, $C_{30}$; the mixture of $C_{18}$, $C_{20}$ and $C_{22}$ alkanols available commercially, where the $C_{22}$ alkanol is the predominate component; a particularly suitable mixture of these alkanols contains 90% or more of the $C_{22}$ alkanol.

The acidic reactant is a benzene tricarboxylic acid or an anhydride thereof—only carboxyl (and anhydride) groups are present. These are trimellitic acid, trimellitic anhydride, trimesic acid, hemimellitic acid and hemimellitic anhydride.

When the monoester is formed from the acidic member and an alkanol, the acidic member: alkanol reaction charge is in a mole ratio from about 1:0.9 to about 1:1.1 and preferably an equimolar ratio.

The acidic member and the alkanol are vigorously agitated and the reaction carried out at a temperature below about 120° C.—this is in order to avoid formation of diesters and triesters. Generally the monoester reaction is carried out at a temperature from about 80° C. to 120° C., and more usually from about 100° C–115° C.

The waxy resin is obtained by condensing the "monoester" and an alkanediol containing from 2 to 6 carbon atoms, such as ethylene glycol, propylene glycol, and hexanediol. Particularly suitable alkanediols are neopentyl glycol and 1,4-butanediol.

The condensation reaction is carried out under more or less conventional conditions for polyesterification-condensation reactions. The reaction zone is vigorously agitated to improve contacting while the temperature is maintained between about 125° C and 225° C., commonly on the order of 170° C. Water produced in the reaction is continuously withdrawn. The time of reaction is determined by the type of reactants and the temperature of reaction; the waxy solid resin product has an acid number of not more than about 30.

When an essentially pure monoester is used in the condensation reaction, the mole ratio of said monoester to the alkanediol in said reaction zone is between about 1:1 and about 1.25:1.

In the more usual instances when the "monoester" is made by direct reaction of acidic member and alkanol before the condensation reaction, the ratio of reactants in the condensation zone is related to the acidic member charged to the "monoester" prepared for simplicity in directions. The mole ratio of acidic member in the charge to the "monoester" preparation to the alkanediol is from about 1:0.9 to about 1:1.1 and is preferably 1:1.

The resin obtained from the condensation reaction is a waxy solid with, usually, a glossy surface. These waxy resins are very soluble in hydrocarbons which are solvents for natural waxes and solid paraffins. Examples of these solvents are naptha, benzene, mineral spirits, toluene and chlorobenzenes. These resins also have a large solubility in alcohols such as isopropanol and butanol.

Application of a thin film of a hydrocarbon solution of these resins on a surface such as wood results, on vaporization of the solvent in a surface coating ranging from a dull-lustre to a bright gloss, without buffing or rubbing of the coating. All these resin surface coatings can be rubbed or buffed into hard, glossy surfaces. All of these coatings are very resistant to smearing from hand pressure. The better dry-bright surface coatings are as good as the coatings produced by buffing application of commercial wax polishes. In smear resistance, these surface coatings are far superior to those produced from commercial waxes available today.

Notably surface coatings formed from alcohol solution are, in general, equal to the gloss—dry-bright—of the surface coatings formed from hydrocarbon solution. Where not equal a light buffing produces an equally bright (often brighter), hard surface.

The resins of the invention are illustrated by the following working example. It is to be understood that this is merely a specific species and is not to be construed as limiting the scope of the claims.

Example

In an ordinary beaker provided with a propeller stirrer, equimolar amounts of trimellitic anhydride and a commercial mixture of $C_{18}$, $C_{20}$ and $C_{22}$ alkanols—90% of the $C_{22}$—were reacted at a temperature over the range of 100°–115° C. At the beginning the beaker contained a slurry of solid anhydride particles in the liquid alcohol; at the end, the beaker contained a pasty solid of monoester.

98 g. (0.2 mole) of this monoester and 26 g. (0.25 mole) of neopentyl glycol were reacted, with vigorous stirring, in a flask fitted with a reflux condenser and water-trap, at 175°–195° C. for 4 hours. The product was a pale tan, waxy resin with an acid number of 30.

A. 30 grams of the resin was dissolved in 90 grams of mineral spirits by warming. The mineral spirits was a petroleum hydrocarbon having an ASTM distillation range of 307° F.–397° F. (153° C.–203° C.), a flash point of 104° F. (40° C.) and a kauri-butanol No. of 36.5. A yellow solution resulted which remained completely clear at room temperature. Upon application to wood and metal surfaces, a coating was obtained which dried bright without any buffing. The finish had a mellow waxy sheen and was quite dry to the touch. It did not pick up dust. The surface was resistant to smear and had relatively good mar resistance. Mars could be removed by facile buffing. (In this respect it is far superior to commercial products.)

B. 20 grams of the resin was dissolved in 40 ml. of hot isopropanol. A precipitate formed at 30° C. and at room temperature the mix was a soft paste. This paste could be spread with a soft cloth to give a bright finish with no buffing necessary after the layer was dry. This constitutes a solvent type polish useful for asphalt and rubber tile, which surface does not tolerate hydrocarbon solvents. Even on asphalt tile a good gloss was obtained.

Thus having described the invention, what is claimed is:

1. A waxy resin prepared by condensing (I) a monoester of an acidic member selected from the class consisting of unsubstituted benzene tricarboxylic acids and anhydrides thereof and an alkanol containing from at least 18 to about 30 carbon atoms and only carbon, hydrogen and oxygen atoms and (II) an alkanediol containing from 2 to 6 carbon atoms and only carbon, hydrogen and oxygen atoms, in a mole ratio of said monoester to alkanediol of from about 1.0:1 to about 1.25:1, at a temperature between about 125° C. and 225° C., with continuous withdrawal of water of reaction until condensation is essentially complete, to obtain a waxy solid resin product having an acid number of not more than about 30.

2. A waxy resin prepared by condensing (A) the ester made by reacting (i) an acidic member selected from the class consisting of unsubstituted benzene tricarboxylic acids and anhydrides thereof and ((ii) an alkanol containing from at least 18 to about 30 carbon atoms and only carbon, hydrogen and oxygen atoms, in a mole ratio of said acidic member to said alkanol of from about 1:0.9 to about 1:1.1, at a temperature below about 120° C., and (B) an alkanediol containing from 2 to 6 carbon atoms and only carbon, hydrogen and oxygen atoms, in a mole ratio of acidic member present in the charge to A to said alkanediol of from about 1.1:1 to about 1.3:1, with continuous withdrawal of water of reaction until condensation is essentially complete, to obtain a waxy solid resin product having an acid number of not more than about 30.

3. The resin of claim 2 wherein said alkanol is 1-octadecanol.

4. The resin of claim 2 wherein said alkanol is docosanol.

5. The resin of claim 2 wherein said acidic member is trimellitic anhydride.

6. The resin of claim 2 wherein said acidic member is trimesic acid.

7. The resin of claim 2 wherein said alkanediol is neopentyl glycol.

8. The resin of claim 2 wherein said alkanediol is 1,4-butanediol.

9. The resin of claim 2 wherein said ratio of acidic member to alkanol is 1:1.

10. The resin of claim 2 wherein said ratio of acidic member present in the reaction charge to A to alkanediol is from about 1.2:1 to 1.25:1.

11. A waxy resin suitable for use in wax polishes which resin is prepared by condensing (Y) the ester made by reacting (a) trimellitic anhydride and (b) a mixture of alkanols containing 18–22 carbon atoms and only carbon, hydrogen and oxygen atoms, wherein the $C_{22}$ alcohol predominates, in about an equimolar ratio of said anhydride to said mixture, at a temperature from about 100°–115° C. and (Z) neopentyl glycol, in a mole ratio of said anhydride to said glycol of about 1:1.25, at a temperature on the order of 175°–195° C. for about 4 hours, with continuous withdrawal of water of reaction, to obtain a hard, waxy resin having an acid number of 30.

References Cited in the file of this patent
FOREIGN PATENTS
881,823   France _____ May 19, 1943